Oct. 16, 1951     C. M. CARSON     2,571,340

PACKAGING

Filed April 8, 1949

INVENTOR.
CLARENCE M. CARSON
BY R. H. Waters
    Attorney

Patented Oct. 16, 1951

2,571,340

UNITED STATES PATENT OFFICE 2,571,340

PACKAGING

Clarence M. Carson, Silver Lake, Ohio, assignor to Wingfoot Corporation, Akron, Ohio, a corporation of Delaware Application April 8, 1949, Serial No. 86,169

1 Claim. (Cl. 99—171)

This invention relates to the packaging of foodstuffs such as freshly picked fruits and vegetables, etc., which give off carbon dioxide. The package used is formed of two packaging materials—one of which transmits carbon dioxide at a higher rate than the other. The two packaging materials are so combined in the package that the rate of transmission of carbon dioxide through the walls of the package is less than the rate at which carbon dioxide is evolved by the foodstuff, but is sufficient to maintain the carbon dioxide content of the atmosphere within the package below the level at which deterioration of the foodstuff is accelerated. At least one of the packaging materials is preferably transparent and so placed as to make the contents of the package visible.

It is known that freshly picked fruits and vegetables give off carbon dioxide for a considerable period after they are picked. Other foodstuffs such as freshly sliced potatoes, etc. likewise evolve carbon dioxide. A satisfactory package for such foodstuffs retards the escape of gases so as to maintain within the package a higher concentration of carbon dioxide than is found outside of the package. However, this carbon dioxide content must be below a certain maximum for the preservation of the foodstuff in the best condition. For example, apples, if packaged in an atmosphere of too high a carbon dioxide content, develop different types of rots, etc. On the other hand, if packaged where there is free circulation of air they lose moisture relatively fast. If packaged where the loss of moisture (and incidentally the loss of carbon dioxide) is restricted while maintaining the carbon dioxide content below a predetermined level, their storage life is prolonged. The following table indicates, by way of example, the rate of gas evolution of several types of produce and the best level at which to maintain the carbon dioxide in the atmosphere of the storage room.

| Product | $CO_2$ Evolution | | Preferred $CO_2$ Concentration |
|---|---|---|---|
| | Temperature | Rate | |
| | °F. | Mgs./kg./hr. | Per cent |
| Apples | 32 | 3–4 | 5–7 |
| Cherries | 32 | 6–8 | 9–12 |
| Potatoes | 32 | 3–5 | 5–7 |

The above table is to be considered as suggestive only because different types of the same fruits and vegetables, and those of the same type but picked when ripened to different degrees, evolve carbon dioxide at different rates. The rate of gas evolution also depends on the storage temperature. Thus, if the above fruits are stored at 60° F. instead of 32° F. the apples will evolve 15 to 30 mgs./kg./hr. of carbon dioxide, and the cherries 50 to 60 mgs./kg./hr. At 70° F. the potatoes will evolve 10 to 16 mgs./kg./hr. of carbon dioxide.

Even sliced Irish potatoes can be stored for appreciable periods at temperatures of about 30 to 40° F. if the carbon dioxide content of the atmosphere in which they are stored is maintained at about 3 to 6 per cent. The preferred storage temperature is 34° F.

Thus, the best conditions for the preservation of foodstuffs vary and there is no single standard of preferred conditions. The package of this invention is flexible and can be designed to maintain a carbon dioxide content below any given maximum which is best adapted for the preservation of the foodstuff which is packaged in it.

The packages of this invention retard the rate at which moisture is given off from them and by proper selection of the wrapping materials employed, the rate at which moisture and carbon dioxide are given off from the package can be independently controlled.

In the further description of this invention reference will be made to the rate of gas diffusion and the rate of moisture diffusion through various wrapping materials. The latter is often referred to as the WVTR, the water-vapor transfer rate. The figures employed in referring to gas diffusion are those obtained by measurement in an apparatus described in Modern Packaging, vol. 16, No. 11, page 69 (July 1943). One side of the film or membrane under test is in contact with a vacuum. The other side is in contact with carbon dioxide under normal pressure. The depression of the mercury in a manometer connected to the vacuum side indicates the volume of gas which has passed through the film. The diffusion rates are indicated in cubic centimeters of gas passed through 100 square inches of a packaging material per 100 hours. This equipment is not satisfactory for measuring packaging materials having rates of gas diffusion over 10,000 cubic centimeters because of the necessity of maintaining a vacuum on one side of the film. Various papers and films have diffusion rates of this magnitude. However, there is no reference to such high gas diffusions in this specification.

References to moisture diffusion herein refer to the number of cubic centimeters of water transferred through 100 square inches of a packaging material per 24 hours at 40° C. when one side of the film is maintained at 0 relative humidity and the other side is maintained at 100 per cent relative humidity, as described in A. S. T. M. specification D830–45T (1946 Book of A. S. T. M. Standards, Pt. III-B, page 1255).

The invention will be further described in connection with the accompanying drawings in which—

Figure 1:
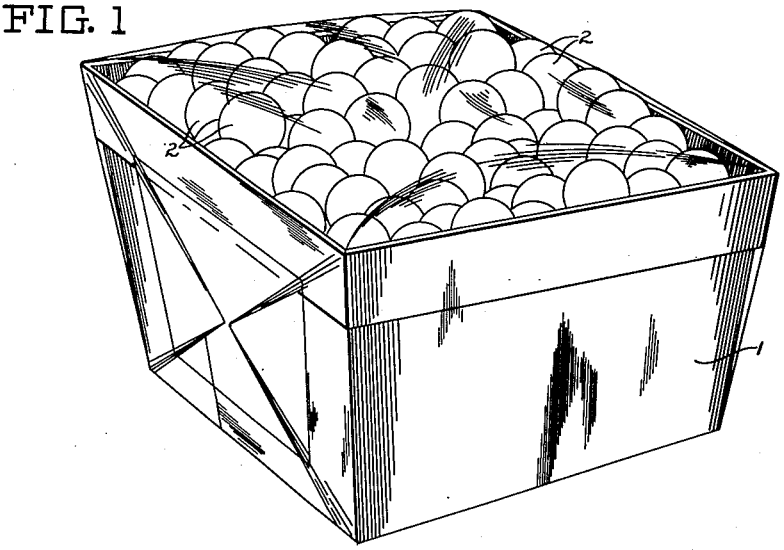
Fig. 1 represents an elevation of a box of Bing cherries wrapped according to this invention.
Figure 2:
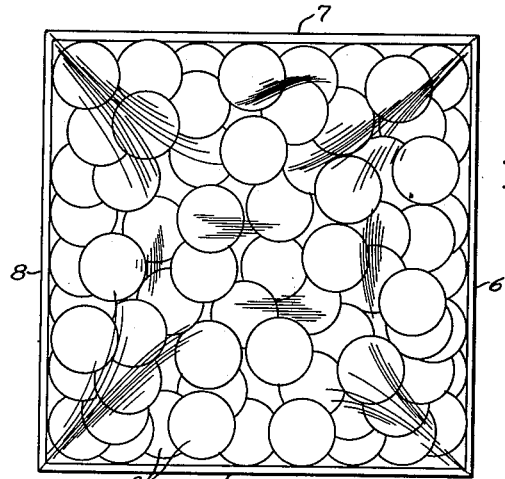
Fig. 2 is a plan view of the same.

Fig. 1 illustrates a one-quart wooden box 1 of any usual dimensions filled with Bing cherries 2. It is wrapped in a wrapper of the type shown in Fig. 3. The central panel 3 is of transparent film and the side panels 4 and 5 are opaque, being made of coated semi-glassine paper. Each of these panels is about six inches wide and the paper overlaps the transparent film about one-eighth to one-quarter inch at each edge of the central panel. The film and the coating on the paper are both heat-sealable and the opaque sheets are joined to the film by the application of heat and pressure to the overlapping portions. The transparent panel 3 forms a windowed opening through the wrapper, and this is placed over the open top of the box. The transparent panel is advantageously folded in a relatively flat condition against the opposite sides 6 and 8 of the box. The opposite ends of the wrapper are then sealed together at the bottom of the box. The relatively opaque panels are then folded over the other sides 7 and 9, and sealed. These seals may be made with glue or they may be formed with short strips of adhesive tape. Either type of seal may be used satisfactorily.

Tests disclose that Bing cherries shipped in refrigerated cars from the Pacific Coast halfway across the continent, and then offered on the market, if shipped in open unprotected boxes, become dehydrated and moldy or rotten in a maximum of about sixteen days after harvest. However, if packaged according to this invention their life can be doubled.

Such cherries tolerate an atmosphere of about twelve per cent carbon dioxide without mold formation and decay. If the cherries are picked ripe and stored in an atmosphere of higher carbon dioxide content they acquire a sharp, tart taste. If picked before being fully ripened, and if they are in a disease-free condition, they might be held for several months if stored in an atmosphere of regulated higher carbon dioxide content. However, it is common practice to pick such cherries after they are fully ripened and they are shipped only in season. They are usually stored and shipped at a temperature of about 40 to 45° F. For the shipment of such cherries a carbon dioxide content of no more than twelve per cent within the package gives the best results. If shipped in unwrapped boxes the cherries show dehydration in one week, and have a wrinkled appearance and tough skins and pulp. The weight loss may be as high as twenty per cent in the first week after harvest. The stems soon begin to turn brown and the riper cherries have black or dark red-black skins.

No satisfactory wrapper has been found which maintains the desired carbon dioxide content of not over twelve per cent in boxes of Bing cherries while reducing moisture losses to the minimum consistent with maintaining a carbon dioxide content of this level. According to this invention the cherries are wrapped in a combination of wrappers, each having a different carbon dioxide diffusion rate. The wrapper with the lower carbon dioxide diffusion rate, if used alone, would transmit carbon dioxide from the package at a rate lower than the rate at which it is evolved by the freshly picked cherries. The wrapper of higher diffusion rate, if used alone would lose carbon dioxide as fast as it is evolved by the cherries. A sufficiently large surface of the package is made of the wrapper of lower diffusion rate so that the rate at which the carbon dioxide is given off from the package is less than the rate at which carbon dioxide is evolved by the cherries, but yet the loss of carbon dioxide from the package is sufficiently great to maintain a carbon dioxide content within the package in the range of nine to twelve per cent of the total gas content.

The transparent wrapper 3 is rubber hydrochloride film. The opaque portions 4 and 5 of the wrapper are of semi-glassine paper coated with a solution of copolymer of styrene and 1,3-butadiene used in approximately the ratio of 75 parts by weight of the styrene to 25 parts by weight of the butadiene. The copolymer is soluble in aromatic hydrocarbons such as benzene, toluene, etc. A satisfactory copolymer is one which has a so-called deformation point of 20–30° C. The deformation-point temperature is obtained by placing a strip of the plastic measuring 7 inches long by 1 inch wide and $\frac{1}{8}$ inch thick, on two supports $\frac{1}{2}$ inch high and 5 inches apart. Thus the strip is supported one inch from each end. This is immersed in water which is gradually heated so that its temperature rises 1° C. per minute. At intervals, pressure is applied to the midpoint of the strip and the temperature recorded is the first temperature at which the strip when pushed to the bottom of the vessel ($\frac{1}{2}$ inch below it) does not return to its original height. This is the deformation point.

The paper used in preparing the panels 4 and 5 was the type usually used for waxed bread wrappers. It is a super-calendered light-weight paper which has not been beaten to the same degree as glassine pulp, and hence is white in appearance instead of being translucent, and is commercially known as a semi-glassine. Coatings of the above copolymer of two and three pounds per ream (3000 sq. ft.) on this paper gave a packaging material with a carbon dioxide diffusion rate of about 4000 cc. and 5000 cc., respectively, per 100 sq. in. per 100 hours, and both gave a water vapor transfer rate of 12 to 15 grams per 100 sq. in. per 24 hours.

The rubber hydrochloride film used for the transparent panel 3 was .00075 inch thick and had a plasticizer content of 17.5 per cent. It is the type sold commercially as 75FF Pliofilm and compared to most rubber hydrochloride films has a relatively high rate of carbon dioxide diffusion. Its carbon dioxide diffusion rate is 3000 cc. per 100 sq. in. per 100 hours. Its water vapor transfer rate is 5.25 grams per 100 sq. in. in 24 hours.

Tests were made with various wrappers. Several packages were wrapped entirely in rubber hydrochloride film and some were wrapped in combination wrappers composed in part of rubber hydrochloride film and in part of the coated semi-glassine paper. The wrappers were used on the ordinary quart size boxes of Bing cherries, open at the top. The cherries had been picked fresh and shipped in refrigerated cars half-way across the country in an unwrapped condition before being packaged and wrapped for testing. The combination wrappers were made of rubber hydrochloride film six inches wide and side panels of coated semi-glassine six inches wide. The boxes were wrapped as shown in the drawing with the rubber hydrochloride over the top and extending in a substantially flat condition over two of the sides and the bottom of the box, and with the side panels folded to the other two sides of the box and sealed.

The following table compares the moisture losses obtained on this test. As a consequence of the low gas and moisture loss through rubber hydrochloride the boxes of cherries enclosed entirely in rubber hydrochloride film built up a carbon dioxide content over the permissible maximum of twelve per cent. The carbon dioxide level in the packages made of the combination films will be discussed below.

Table I

| Type of Wrapper | Moisture Loss in 6 Weeks at 45° F. |
|---|---|
| | Per cent |
| 75FF Pliofilm | 2.5 |
| 75FF Pliofilm plus coated semi-glassine | 15.4 |
| 50P4F Pliofilm | 6.7 |
| 50P4F Pliofilm plus coated semi-glassine | 19.2 |
| 80P6NF Pliofilm | 7.7 |
| 80P6NF Pliofilm plus coated semi-glassine | 13.7 |

The test included as a control an unwrapped box of cherries. These cherries lost 36 per cent of their moisture in only three weeks, and in the same time became hard, dehydrated and tough with no flavor. The control was maintained at the same temperature as the test material. The stems on the cherries in the control package were hard, black and woody.

In the foregoing table the films are defined by reference to their trade designations. That known as 75FF Pliofilm has previously been described.

80P6NF Pliofilm designates a film of rubber hydrochloride, .0008 inch thick. It contains 15 parts of plasticizer and an agent which renders it non-fogging when transferred from a heated atmosphere to a refrigerated atmosphere under humidity conditions which cause condensation on an untreated rubber hydrochloride surface. This film has a carbon dioxide transmission of 2650 cc./100 sq. in./100 hours and its moisture vapor transfer rate is 3.45 grams/100 sq. in./24 hours.

50P4F Pliofilm identifies a rubber hydrochloride film which contains 10 per cent of plasticizer and which has been stretched in one direction from film .0014 inch thick to a thickness of .0005 inch. Its carbon dioxide diffusion rate is 6000 cc./100 sq. in./100 hours. Its rate of moisture diffusion is 4.65 grams/100 sq. in./24 hours.

The cherries in the three packages wrapped in film only had smooth skins, indicating relatively low moisture loss and the stems were green, but they had a slightly bitter taste which was not a true ripe-cherry flavor. Mold started to form on these packages on the eleventh day of storage, due to the fact that the carbon dioxide content of the atmosphere in the packages was too high. The packages wrapped in the combination wrappers, composed in part of film and in part of coated semi-glassine, lost sufficient moisture in six weeks to cause some roughening of the skin but both the skin and the pulp were tender and the cherries had a sweet cherry-like taste. No mold appeared until the third or fourth week. The stems were not as green as in the packages wrapped entirely in film but they were not dehydrated. The rates of moisture and carbon dioxide diffusion of these combination wrappers is given below. In all of the examples except the fourth the wrapper is formed of half as much rubber hydrochloride film as coated semi-glassine (or cellulose acetate in Wrapper 5). In the fourth example only one-sixth of the area was formed of film and five-sixths of semi-glassine. The rubber hydrochloride films are identified by the commercial designations, explained above. In several of the combinations different coatings were used on the semi-glassine.

| | Fraction of Total Area |
|---|---|
| WRAPPER 1 | |
| Pliofilm 50P4F | ⅓ |
| Semi-glassine coated with 2 lbs. per ream of 25:75 butadiene: styrene coating. $CO_2$ diffusion: 4667 ccs./100 sq. in./100 hours. WVTR: 9 gms./100 sq. in./24 hours. | ⅔ |
| WRAPPER 2 | |
| Pliofilm 75 FF | ⅓ |
| Semi-glassine coated same as in Wrapper 1. $CO_2$ diffusion: 3670 ccs./100 sq.in./100 hours. WVTR: 10 gms./100 sq.in./24 hours. | ⅔ |
| WRAPPER 3 | |
| Pliofilm 80P6NF | ⅓ |
| Semi-glassine coated same as in Wrapper 1. $CO_2$ diffusion: 3670 ccs./100 sq. in./100 hours. WVTR: 9 gms./100 sq. in./24 hours. | ⅔ |
| WRAPPER 4 | |
| Pliofilm 50P4F | ⅙ |
| Semi-glassine coated same as in Wrapper 1. Diffusion rates: intermediate between Wrappers 1 and 2. | ⅚ |
| WRAPPER 5 | |
| Pliofilm 75FF | ⅓ |
| Cellulose Acetate .00088" thick. $CO_2$ diffusion: 10,000 ccs./100 sq. in./100 hours. WVTR: 40 gms./100 sq. in./24 hours. | ⅔ |
| WRAPPER 6 | |
| Pliofilm 75FF | ⅓ |
| Coated semi-glassine with 2 lbs. per ream of cyclized rubber. $CO_2$ diffusion: 8000 ccs./100 sq. in./100 hours. WVTR: 5 gms./100 sq. in./24 hours. | ⅔ |
| WRAPPER 7 | |
| Pliofilm 75FF | ⅓ |
| Coated semi-glassine with 5 lbs. per ream of chlorinated rubber. $CO_2$ diffusion: 6000 ccs./100 sq. in./100 hours. WVTR: 10 gms./100 sq. in./24 hours. | ⅔ |
| WRAPPER 8 | |
| Pliofilm 80P6NF | ⅓ |
| Coated semi-glassine with 2 lbs. per ream of a solution of 85 parts cyclized rubber, plus 15 parts of paraffin wax. $CO_2$ diffusion: 4000 ccs./100 sq. in./100 hours. WVTR: 3.5 gms./100 sq. in./24 hours. | ⅔ |

The above examples show that the moisture vapor transfer rate need not necessarily vary with the rate of carbon dioxide transmission. This is most evident from the following table in which information given above is arranged in order of increasing CO₂ transmission.

Table II

| Wrapper | Carbon Dioxide Transmission | WVTR |
|---|---|---|
| 3 | 3,670 | 9.0 |
| 2 | 3,670 | 10.0 |
| 8 | 4,000 | 3.5 |
| 4 | 4,333 | 15.0 |
| 1 | 4,667 | 9.0 |
| 7 | 6,000 | 10.0 |
| 6 | 8,000 | 5.0 |
| 5 | 10,000 | 40.0 |

The above examples are merely illustrative. Various film materials are available for packaging. Some of these have a gas diffusion rate which is too low for use alone for the packaging of foodstuffs which give off carbon dioxide at a relatively high rate and these may be used in the combination packages of this invention, together with materials of higher gas diffusion rate. Other films have too high a gas diffusion rate to make them satisfactory for use alone in the packaging of foodstuffs which give off carbon dioxide but they may be used in combination with materials of low gas diffusion rate in the manufacture of packages according to this invention. The available commercial films include, for example, the following:

A. Cellophane MSAT-83. Too low gas and water vapor diffusion. When used alone holes must be punched in the film to prevent mold and water logging.

B. Cellophane LST. Satisfactory water vapor diffusion rate for many fruits and vegetables but too low gas diffusion.

C. Cellulose acetate. Too high gas and water diffusion.

D. Saran (copolymer of vinyl chloride and vinylidine chloride). Too low gas and water diffusion. Must be perforated if used alone.

E. Polyethylene. Too high gas diffusion and too low water vapor transmission.

F. Vinylite (vinyl chloride-vinyl acetate copolymer). Satisfactory water vapor transfer but too low gas diffusion.

G. Ethyl cellulose. Too high gas and water vapor diffusion.

H. Pliofilm. The ordinary commercial grades have too low gas and water vapor transfer rates. The stretched sheets .0002 to .0005 inch thick have transfer rates within the desirable range, although such films are difficult to use as wrapping materials because of their thinness.

A variety of wrapping materials are available, including papers and plastics, and these may be coated with a variety of coatings such as cyclized rubber, chlorinated rubber, shellac, varnish, polystyrene, polyvinylbutyral, and a variety of polymer and copolymer resins. These various coating materials may be compounded with ingredients which increase or decrease the gas diffusion rate.

Figure 3:
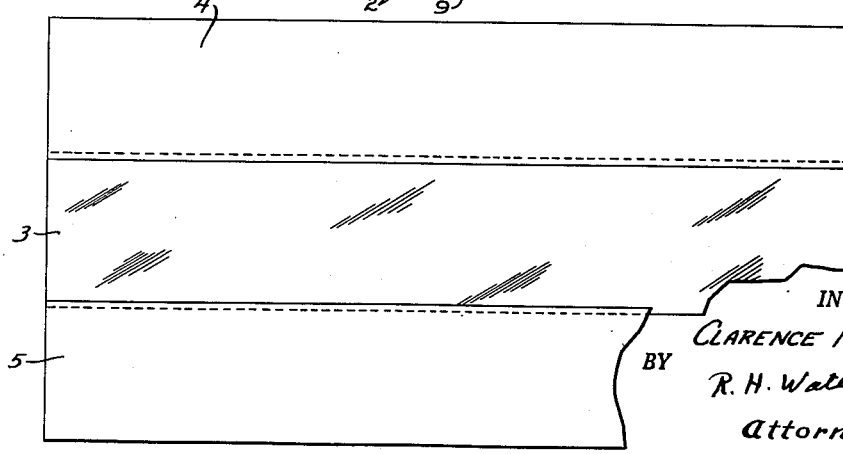
Fig. 3 is a plan view of a sheet of the composite wrapping material employed.

In addition to the possibility of combining different wrapping materials there is the possibility of taking a sheet of uniform composition and regulating the gas diffusion rate by coating. Thus, a semi-glassine which uncoated has a high transfusion rate, may be coated over part of its area with a coating material which has a very low gas diffusion rate, and the balance of the paper may be uncoated or coated with a different material. Thus, instead of forming the composite wrapper by uniting sheets of different composition, the same result may be obtained by treating different portions of the same base material with different coatings. The windowed packages formed by a combination of transparent film with opaque material may be simulated by coating part of a transparent film with an opaque coating. The windows preferably extend throughout the length of the wrapper as illustrated in Fig. 3, but they may be confined to one or more areas surrounded by opaque wrapping material.

The containers may be essentially boxes with over-wraps of the type described and this is generally preferable for the packaging of berries and other small fruits and vegetables, etc. For apples, pears, peaches and the like a liner of the type here described may be used in a large container made of wood or other rigid material. This may be sealed or simply overlapped. For sliced potatoes and the like a bag will be used, a part of which has low carbon dioxide diffusion and the balance of which has a higher carbon dioxide diffusion. Peeled or sliced potatoes maintained in an atmosphere of the proper carbon dioxide content can be kept for several days at 50 to 60° F. without turning black. Thus, the invention has wide application to a variety of different types of packages for the packaging of a wide variety of foodstuffs.

What I claim is:

A package of Bing cherries sufficiently fresh to evolve carbon dioxide in appreciable volume, the package comprising an open box containing substantially a quart of the cherries enclosed in a wrapper formed with a central transparent panel and opaque panels on each side of the transparent panel, the transparent panel being of sufficient width to render at least a large part of the cherries on the top of the box visible therethrough, and being composed of rubber hydrochloride film which transmits carbon dioxide at such a low rate that if the wrapper were composed entirely of said film the package would not lose carbon dioxide as fast as it is evolved by the cherries, the opaque material of the wrapper being composed of semi-glassine coated with copolymer of 1,3-butadiene and styrene of such composition and thickness that the coated sheet transmits carbon dioxide at such a rate that if the box were entirely enclosed in the coated sheet the package would give off carbon dioxide as rapidly as it is evolved by the cherries, the portion of the wrapper composed of the opaque material being such that the wrapper transmits carbon dioxide less slowly than it is evolved by the cherries.

CLARENCE M. CARSON.

REFERENCES CITED

The following references are of record in the file of this patent:

UNITED STATES PATENTS

| Number | Name | Date |
|---|---|---|
| 1,821,106 | Milani | Sept. 1, 1931 |
| 2,001,628 | Nierinck | May 14, 1935 |
| 2,298,545 | Waters | Oct. 13, 1942 |
| 2,402,605 | Cowen | June 25, 1946 |